US012599137B2

(12) United States Patent
Nuñez et al.

(10) Patent No.: US 12,599,137 B2
(45) Date of Patent: Apr. 14, 2026

(54) COMPOSITION FOR THE DRYING OF *TILLANDSIA* SP

(71) Applicant: Maria Ines Nuñez, Beccar (AR)

(72) Inventors: Maria Ines Nuñez, Beccar (AR);
Felipe Wolf, Beccar (AR)

( * ) Notice: Subject to any disclaimer, the term of this patent is extended or adjusted under 35 U.S.C. 154(b) by 343 days.

(21) Appl. No.: 18/262,846

(22) PCT Filed: Mar. 17, 2021

(86) PCT No.: PCT/IB2021/052250
§ 371 (c)(1),
(2) Date: Jul. 25, 2023

(87) PCT Pub. No.: WO2022/195326
PCT Pub. Date: Sep. 22, 2022

(65) Prior Publication Data
US 2024/0206471 A1     Jun. 27, 2024

(51) Int. Cl.
| | |
|---|---|
| *A01N 59/00* | (2006.01) |
| *A01N 43/16* | (2006.01) |
| *A01N 59/02* | (2006.01) |
| *A01N 59/06* | (2006.01) |

(52) U.S. Cl.
CPC ............ *A01N 59/00* (2013.01); *A01N 43/16* (2013.01); *A01N 59/02* (2013.01); *A01N 59/06* (2013.01)

(58) Field of Classification Search
CPC ........ A01N 59/00; A01N 59/02; A01N 43/16; A01N 59/06; A01N 2300/00; A01N 37/02; A01N 37/06; A01N 59/04; A01N 65/08
See application file for complete search history.

(56) References Cited

U.S. PATENT DOCUMENTS

2004/0121026 A1*   6/2004   Kaplan .................. A01N 59/04
424/776

OTHER PUBLICATIONS

INAPI, International Search Report and Written Opinion issued in PCT/IB2021/052250, dated Jun. 10, 2021 (13 pages).
Wolf, "Para combatir el clavel del air", Ciencia & Arte /Economia & Viveros, Aug. 11, 2020. printed Oct. 25, 2023, https://www.economiayviveros.com.ar/agosto2020/plantas_ornamentales_y_flores_de_corte-cultivos_viveros-paisajismo-jardineria-arte_floral-3.html (4 pages).
Torres, L. "Control de Tillandsia recurvata en Bosques de Pintus cembroides del Estado de Coahuila", Programa de Investigacion: Sanidad Forestral Y Agricola; No. 1447183F, 2012 (4 pages).
ISA/CL, English translation of Written Opinion issued in PCT/IB2021/052250, dated Jul. 26, 2021 (11 pages).

* cited by examiner

*Primary Examiner* — Audrea B Coniglio
(74) *Attorney, Agent, or Firm* — Fresh IP PLC; Clifford D. Hyra; Aubrey Y. Chen

(57) ABSTRACT

COMPOSITION TO DEHYDRATE *Tillandsia* sp, characterized in that it comprises, in an aqueous solution, a main component selected at least from Na bicarbonate ($NaHCO_3$), ammonium bicarbonate ($(NH_4)HCO_3$) and calcium hydroxide, for a total, alone or combined with sodium bicarbonate, of from 0.045 $g/cm^3$ of aqueous solution up to 0.10 $g/cm^3$ of an aqueous solution and 0.30 $cm^3$ of a hydroalcoholic solution of carminic acid up to a maximum of 0.80 $cm^3/cm^3$ of an aqueous solution.

5 Claims, 6 Drawing Sheets

$0.25g/cm^3 \equiv 0.50g/cm^3 \equiv 1g/cm^3$

Fig. 4

COMPOSITION FOR THE DRYING OF *TILLANDSIA* SP

1. SCOPE OF THE TECHNICAL APPLICATION OF THE INVENTION

Figure 1:
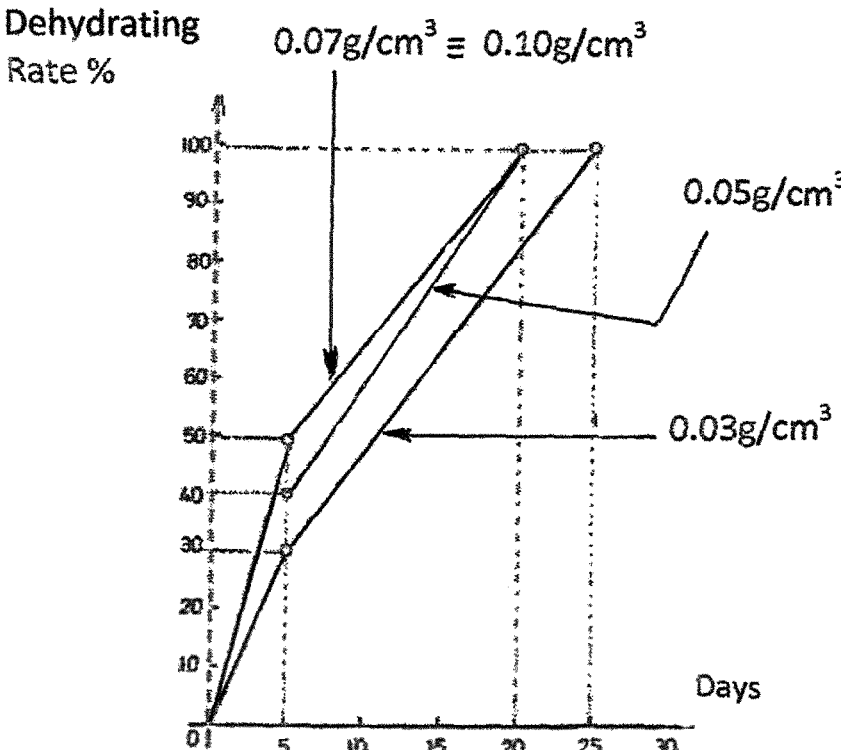

This invention consists of a formulation or composition to eliminate the *Tillandsia* sp or the "air plant" by dehydrating it, regardless of its location or host plant species.

The plant species—*Tillandsia* sp, commonly known as an "air plant" is an epiphytic plant, without roots, which sits on the trunk and branches of other plant species, such as a tree.

In some countries, for example Japan or the USA, landscape designers promote their growth because they are very decorative, but in commercial tree plantations, such as fruit tree plantations, it is a plague.

Within the *Tillandsia* sp family, the *recurvata* and *aeroanthos* varieties are known to innoculate their host (supporting branch) with a biotic, called hydroperoxyl-cycloartane, which dries out the branch. The *Tillandsia* sp is an epiphyte of the Bromeliaceae family, which includes more than 500 species in the Americas. This epiphyte feeds through leaves that are covered with trichomes responsible for collecting water and nutrients from the environment. Its root system is primitive, formed by rhizoids and adapted only to anchor or hold on to the host. These rhizoids secrete hydroperoxycycloartanes that act as inhibitors or allelopathic antibiotics that cause the death of buds, tissues, and abscission of the foliage thus causing death of the host branches.

As an example, and according to the report authored by Lilia García Azpeitia, Sofia Loza Cornejo and Xóchilt Aparicio Fernández of the Instituto Tecnológico, J. Mario Molina Pasquel y Henríquez, from Unidad Lagos de Moreno, and the Universidad de Guadalajara, (MX), the incidence of *Tillandsia recurvata* was analyzed at a stand plantation made up of 60% mesquite (*Prosopis laevigata*) and 40% Huizache (*Acacia farnesiana*), which was affected in 2016 by the aforementioned *Tillandsia recurvata*, causing damage to 100% of both species of trees due to the possible blockage of gas exchange and basic physiological functions such as photosynthesis, and, consequently, the death of some specimens. In 2017, inflorescence production was affected. Fruit production was nil, only a few per tree completed their formation, deficiencies were found in seed formation, size, and shape of pods, as well as in pod maturation. The results showed that the proliferation of *Tillandsia recurvata* is the cause of the forestry problem, which is consistent with the findings of the National Forestry Commission.

The species *Tillandsia recurvata, Tillandsia aeranthos*, and *Tillandsia usneoide*, or the so-called "Spanish Moss" has spread throughout the Americas, driven by increased humidity and higher ambient temperatures. This plant species is not a parasite since it does not feed on the host plant and its rhizoids support it on the host plant, but it kills it by asphyxiation, removing the sun or creating a microclimate of higher humidity with proliferation of fungi, but mainly by the generation of the aforementioned hydroperoxyl-cycloartane toxin.

In the United States, *Tillandsia recurvata* is called "ball moss" and in Mexico "heno motita", which is considered a plague.

2. PROBLEM TO BE SOLVED

Manually removing *Tillandsia* sp from infested plantations is a daunting task, which is impractical and economically impossible. Spraying host plants with agrochemicals is always a possibility, but the risks and collateral damage to the environment, to the plant itself, and to the consumer through the consumption of contaminated fruits is well known. There is a clear need to combat this plague that affects plantations, especially those with commercial value, with a product that is harmless to the host plant species, that does not affect the environment, that does not affect the soil or water tables, and that only uses dehydrating to attack *Tillandsia* sp.

In tropical areas, which is its area of origin, *Tillandsia* sp. has natural predators that regulate its expansion (birds and insects), but this does not occur in subtropical, temperate and cold areas, where there are no such natural predators, which contributes to its indiscriminate expansion.

3. OBJECTIVES OF THIS INVENTION

The objective of this invention is a composition that promotes the natural dehydration of *Tillandsia* sp in all its species on the same host plant species allowing the *Tillandsia* sp, once dehydrated, to degrade by natural causes without affecting the shoots, fruits and branches of the host tree.

The objective of the invention is that this composition, which is capable of dehydrating *Tillandsia* sp, will not affect the host plantation, will not affect the soil, will not contaminate the environment, will not pollute the water table and aquifers with toxic products, and will not present any threat to the consumer of the fruits and to the native fauna.

The objective of the invention is for this composition to be applied by direct spraying on the branches of the affected plant species and host of the *Tillandsia* sp, and that spraying of this novel composition will be the only activity necessary for the *Tillandsia* sp to become dehydrated and eventually degrade through the effects of wind and rain within a period of time averaging between 10 to 45 days.

The objective of the invention is to increase the pH of absorption in the *Tillandsia* s sp. The *Tillandsia* sp, does not feed on nutrients through its roots, which it does not possess as do the majority of other plant species. Instead, the *Tillandsia* sp is nourished through its leaves. The solution of the invention is absorbed by the leaves of the *Tillandsias* sp, resulting in their dehydration or death.

The objective of the invention is a composition capable of causing dehydration of the *Tillandsia* sp, which then causes it to dehydrate without affecting the host plant.

4. OVERVIEW OF THE INVENTION

COMPOSITION TO DEHYDRATE THE *Tillandsia* sp, characterized in that it comprises, in an aqueous solution, a main component selected at least from sodium bicarbonate Na (NaHCO$_3$), ammonium bicarbonate (NH$_4$)HCO$_3$ and calcium hydroxide, for a total, alone or combined with sodium bicarbonate, of from 0.045 g/cm$^3$ of an aqueous solution up to 0.10 g/cm$^3$ of an aqueous solution and 0.30 cm$^3$ of hydroalcoholic solution of carminic acid up to a maximum of 0.80 cm$^3$/cm$^3$ of an aqueous solution.

5. DETAILED DESCRIPTION OF THIS INVENTION

For the purpose of specifying the preferred embodiments of this invention through the description thereof as given below, to illustrate it in detail, including within the scope of protection of the invention the possible means equivalent to those mentioned; being the scope of this invention determined by the first claim attached within the corresponding Claims chapter.

Sodium bicarbonate causes the *Tillandsia* sp to dehydrate. Ammonium bicarbonate is optional and the formulation works correctly even without this addition, but with slower results, therefore its inclusion accelerates the dehydration process. The inclusion of carminic acid has two rationales:

i It increases the pH of the solution. It has been found that any plant species that does not feed from its roots in the soil, is fed from the leaves of the host species. By increasing the pH, the absorption of nutrients is increased. Bicarbonates are harmless to the leaves of the host plant species, which feeds through its roots, but will dehydrate the *Tillandsia* sp.

ii It increases the degree of fixation of the composition in solution of this invention on *Tillandsia* sp acting as an adjuvant.

EMBODIMENTS

Example 1

We began by spraying the branches, leaves, and trunk of the plant species where the *Tillandsia* sp was anchored with a solution in water containing 50 to 100 grams of sodium bicarbonate per 10,000 cm$^3$. This aqueous solution proved to be very poor, giving dehydration results of *Tillandsia* sp of less than 30%.

Example 2

The trunk, branches, and leaves of the host species were then sprayed with a room temperature aqueous solution of sodium bicarbonate at maximum solubility, about 1,000 g/10,000 cm$^3$ of water. The result obtained was negative, since the leaves of the host species thus sprayed were found to be burned.

Next, we proceeded to form a sampler consisting of a base on which a series of wooden slats separated at parallel intervals were placed, to which perpendicular slats were crossed, achieving a plurality of cells for a total of 49 flat cells. One specimen of *Tillandsia aeranthos* and one of *Tillandsia recurvata* were placed inside each cell. Each box was designated with a sequential number from No. 1 to No. 49 and a photographic follow-up was taken every 5 days for a total of 30 days.

Example 3

Test of NaHCO$_3$ in water. A solution of 100 g/10,000 cm$^3$ was added to box No. 1. After 30 days there was no dehydration effect, with a pH=8.

Example 4

Test of only NaHCO$_3$ in water. A solution of 300 g/10,000 cm$^3$ was added to box 2. After 5 days, 30% dehydration was observed, and after 28 days the *Tillandsia* sp was completely dehydrated, with a pH=8.1

Example 5

Test of only NaHCO$_3$ in water. A solution of 500 g/10,000 cm$^3$ was added to box 3. After 5 days, 40% dehydration was observed and after 20 days the *Tillandsia* sp were completely dehydrated, with a pH=8.2.

Example 6

Test of only NaHCO$_3$ in water. A solution of 700 g/10,000 cm$^3$ was added to box No. 4. After 5 days, 50% dehydration was observed, and after 20 days the *Tillandsia* sp was completely dehydrated, with a pH=8.2.

Example 7

Test of only NaHCO$_3$ in water. A solution of 1000 g/10,000 cm$^3$ was added to box No. 5. After 5 days, 50% dehydration was observed and after 20 days, the *Tillandsia* sp were completely dehydrated, with a pH=8.2. In this case, when the solubility limit is reached, the NaHCO$_3$ is decanted.

Example 8

Test of only (NH$_4$) HCO3 in water. A solution of 100 g/10,000 cm$^3$ was added to box 6. After 30 days, no dehydration effect was observed.

Example 9

Test of only (NH$_4$)HCO3 in water. A solution of 500 g/10,000 cm$^3$ was added to box No. 7. After 30 days, no dehydration effect was observed.

Example 10

Test of only (NH$_4$) HCO3 in water. A solution of 1,000 g/10,000 cm$^3$ was added to box No. 8. After 30 days, no dehydration effect was observed.

Example 11

Test of only (NH$_4$) HCO3 in water. A solution of 1,500 g/10,000 cm$^3$ was added to box 9. After 90 days, a total dehydration effect was observed. The slow dehydration rate was observed in this test. The pH of the solution decreases with the concentration of (NH$_4$) HCO3

Example 12

Test of only carminic acid in hydroalcoholic solution. 1 cm$^3$/10,000 cm$^3$ of this carminic acid solution was added to box No. 10. After 30 days, no dehydration effect was observed. The pH of the aqueous solution was=7.70.

Example 13

Test of only carminic acid in hydroalcoholic solution. 3 cm$^3$/10,000 cm$^3$ of this carminic acid solution was added to box No. 11. After 30 days, no dehydration effect was observed. The pH of the aqueous solution=7.77.

Example 14

Test of only carminic acid in hydroalcoholic solution. 8 cm$^3$/10,000 cm$^3$ of said carminic acid solution was added to box No. 13. After 30 days no dehydration effect was observed. The pH of the aqueous solution=8.05.

Example 16

Test of only carminic acid in hydroalcoholic solution. 8 cm$^3$/10,000 cm$^3$ of this carminic acid solution was added to box 14. After 30 days, no dehydration effect was observed. The pH of the aqueous solution was 8.05.

Example 17

Test of only carminic acid in hydroalcoholic solution. 10 $cm^3/10,000$ $cm^3$ was added to box No. 15. After 30 days, no dehydration effect was observed. The pH of the aqueous solution=8.26. It is reasonable to conclude that the use of use of carminic acid alone does not dehydrate *Tillandsia* sp.

Example 18

The following series of tests correspond to a solution with combined components. $NaHCO_3$+carminic oxide was used. The working proportion of 700 g of $NaHCO_3$ was used and kept fixed by varying the percentage of carminic acid added. 1 $cm^3$ of carminic acid solution/10,000 $cm^3$ of water was added to box No. 16 After 5 days dehydration of 50% was observed, and complete dehydration after 30 days (pH=8.27).

Example 19

The solution with 3 $cm^3$ of carminic acid solution/10,000 $cm^3$ of water was used into box No. 17. After 5 days dehydration of 60% was observed, and complete dehydration after 20 days (pH=8.31).

Example 20

The solution with 5 $cm^3$ of carminic acid solution/10,000 $cm^3$ of water was used into box No. 18. After 5 days dehydration of 70% was observed, and complete dehydration after 20 days (pH=8.32).

Example 21

The solution with 8 $cm^3$ of carminic acid solution/10,000 $cm^3$ of water was used into box 19. After 5 days dehydration of 80% was observed, and complete dehydration after 20 days (pH=8.32).

Example 22

A solution with 10 $cm^3$ of the carminic acid solution/10,000 $cm^3$ of water was used Into box No. 20. After 5 days dehydration of 80% was observed, and complete dehydration after 20 days (pH=8.33).

Example 23

The following series of tests correspond to a composition with a fixed amount of $NaHCO_3$ in 700 g/10,000 $cm^3$ of water and a fixed amount of 5 $cm^3$ of carminic acid solution in 10,000 $cm^3$ of water. 2,000 g of ammonium bicarbonate is added to this composition. After 5 days, 80% of the *Tillandsia* sp were dehydrated and completely dehydrated after 10 days into box No. 21 but burnt plants and new shoots were observed.

Example 24

A composition of 700 g/10,000 $cm^3$ of Na bicarbonate water was placed into box 22 and Ponceau Red 4R was used instead of carminic acid, with 250 g of 4R/10,000 $cm^3$ of water. After 5 days dehydration of 50% was observed, and complete dehydration after 60 days, but all the elements wetted by the aforementioned composition were completely colored. (pH=8.23)

Example 25

A composition of 700 g/10,000 $cm^3$ of Na bicarbonate water was placed into box 23 and Ponceau Red 4R was used instead of carminic acid, with 500 g of 4R/10,000 $cm^3$ of water. After 5 days dehydration of 50% was observed, and complete dehydration after 60 days, but all the elements wetted by the aforementioned composition were completely colored. (pH=8.23).

Example 26

A composition of 700 g/10,000 $cm^3$ of Na bicarbonate water was placed into box 24 and Ponceau Red 4R was used instead of carminic acid, with 500 g of 4R/10,000 $cm^3$ water. After 5 days dehydration of 50% was observed, and complete dehydration after 60 days, but all the elements wetted by the aforementioned composition were completely colored. (pH=8.23).

Example 27

A composition of 700 g/10,000 $cm^3$ of Na bicarbonate water was placed into box 25 and Ponceau Red 4R was used instead of carminic acid, with 1,000 g of 4R/10,000 $cm^3$ water. After 5 days dehydration of 50% was observed, and complete dehydration after 60 days, but all the elements wetted by the aforementioned composition were completely colored. (pH=8.23).

In these examples with 4R it is evident that the variation thereof does not affect the performance of the composition and the final dehydration is slower, apart from the inconvenience of the dyeing of all the objects sprayed.

Example 28

In this series of tests, a composition of 700 g/10,000 $cm^3$ of Na bicarbonate water and 5 $cm^3$ of carminic acid solution in 10,000 $cm^3$ of water was added to 10 g of $Ca(OH)_2$ (hydrated lime)/10,000 $cm^3$ of water. When this composition was sprayed into box 26, 50% dehydration was observed after 5 days and complete dehydration after 20 days. (pH=8.19).

Example 29

To the composition of 700 g/10,000 $cm^3$ of Na bicarbonate water and 5 $cm^3$ carminic acid solution in 10,000 $cm^3$ water, 20 g of $Ca(OH)_2$ (hydrated lime)/10,000 $cm^3$ water was added. When this composition was sprayed into box 27, 50% dehydration was observed after 5 days and complete dehydration after 15 days. (pH=8.27).

Example 30

To the composition of 700 g/10,000 $cm^3$ of Na bicarbonate water and 5 $cm^3$ carminic acid solution in 10,000 $cm^3$ water, 30 g $Ca(OH)_2$ (hydrated lime)/10,000 $cm^3$ water was added. When this composition was sprayed into box 28, 50% dehydration was observed after 5 days and complete dehydration after 15 days. (pH=8.45).

Example 31

In the next series of tests, a composition with 700 g/10,000 $cm^3$ of Na bicarbonate water and 5 $cm^3$ of carminic acid solution in 10,000 cm³ of water was used, and 40 g/10,000 cm³ of calcium sulfate (CaSO₄) was added. When this composition was sprayed into box 29, 50% dehydration was observed after 5 days and complete dehydration after 20 days. (pH=7.08).

Example 32

A composition with 700 g/10,000 cm³ of Na bicarbonate water and 5 cm³ of carminic acid solution in 10,000 cm³ of water was used into box 30, and 80 g/10,000 cm³ of calcium sulfate (CaSO₄) was added. When this composition was sprayed, it was found to be 60% dehydrated after 5 days and fully dehydrated after 20 days. (pH=6.80).

Example 33

A composition with 700 g/10,000 cm³ of Na bicarbonate water and 5 cm³ of carminic acid solution in 10,000 cm³ of water was used into box 31, and 120 g/10,000 cm³ of calcium sulfate (CaSO₄) was added. When this composition was sprayed, it was found to be 70% dehydrated after 5 days and completely dehydrated after 20 days. (pH=6.36).

CONCLUSIONS

According to Example No. 1, the sole use of Na bicarbonate with a solution in water of 50 to 100 grams of Na bicarbonate per each 10,000 cm³, does not give any result, i.e., at low concentrations, the active ingredient (bicarbonate) is not a solution to the problem posed to dehydrate *Tillandsia* sp.

Figure 2:
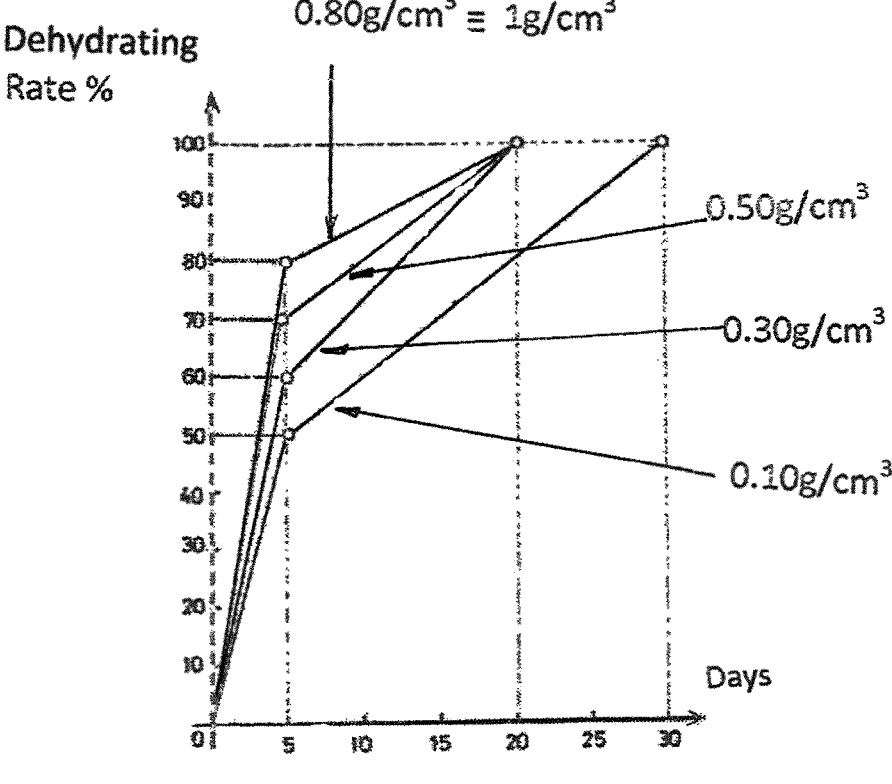

In Example 2, a test is carried out with the maximum concentration at the highest pKa at room temperature, i.e., with a concentration of 0.10 g/cm³. At this concentration, the solubility limit is reached, with the aggravating factor that burns the shoots and leaves of the host plant.

bicarbonate of Na, increases the absorption or fixation thereof on the *Tillandsia* sp. In other words, it acts as an adjuvant. The increase in the dehydration rate is observed after 5 days and the rapid total dehydration rate at 20 days is shown in FIG. 2.

Figure 3:
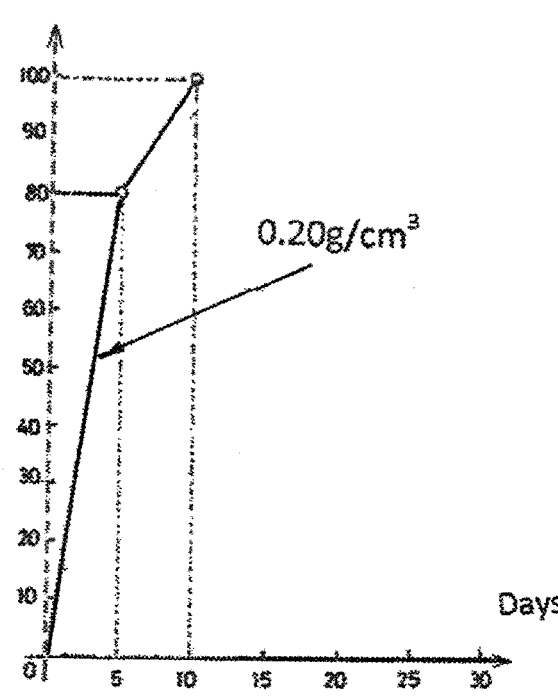

Example No. 23 illustrates by means of FIG. 3 the behavior of a solution in bicarbonate of Na water+carminic acid+ammonium bicarbonate. The incorporation of ammonium bicarbonate accelerates the dehydration process due to its leavening properties as shown in FIG. 3 leavening agents when working in conjunction with Na Bicarbonate, achieving complete dehydration after 10 days.

Figure 4:
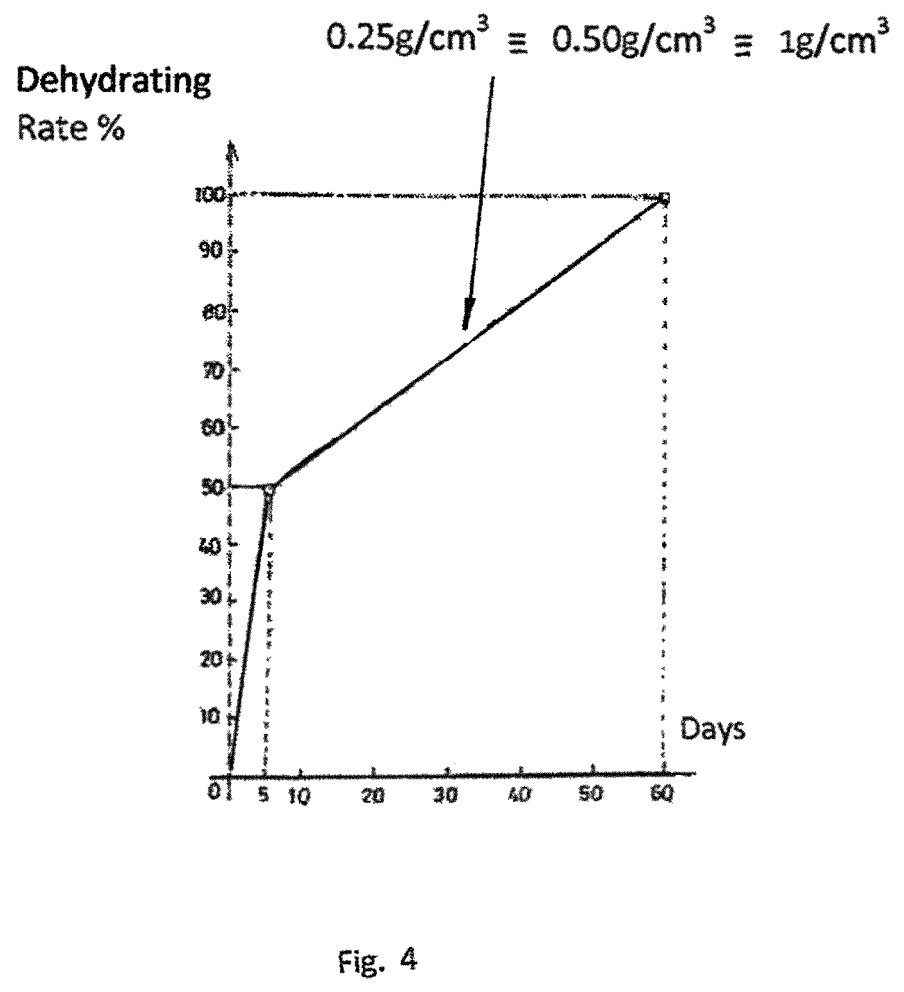

In FIG. 4, we observe the graph of the slow rate for complete at 60 days using Na Bicarbonate, Ponceau Red 4R instead of carminic acid, in a water solution, all according to example No. 24 to No. 26, observing that the slow rate for complete dehydration does not vary with the difference in 4R concentration, i.e., the absorption slows down.

Figure 5:
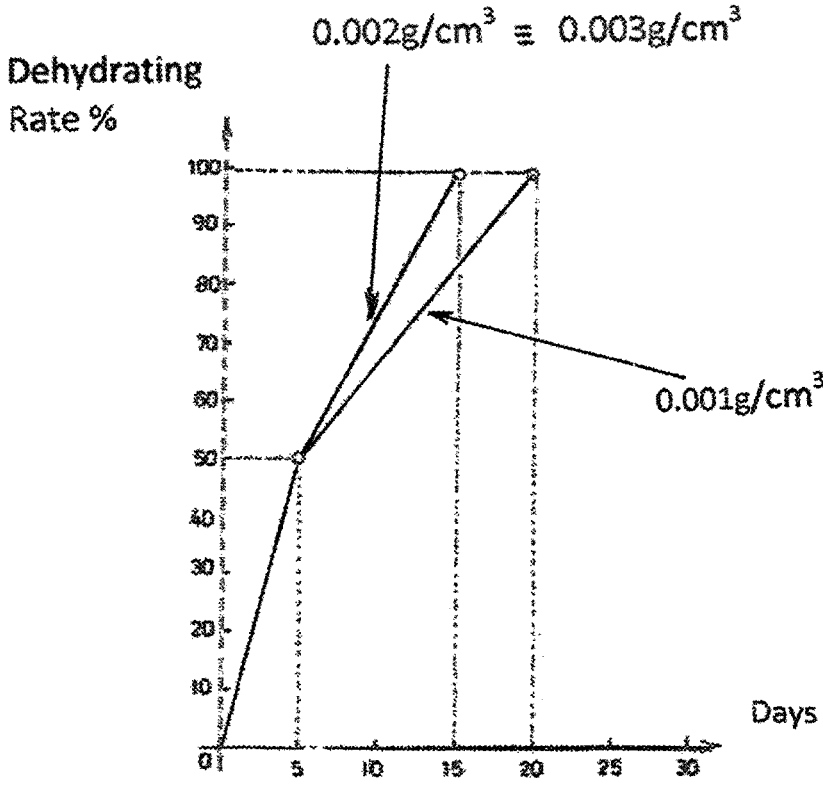

FIG. 5, allows us to observe the behavior of the solution of the invention if Ca(HO)₂ is used. Examples No. 29 to No. 30 and FIG. 5 show the elevated dehydration rate at 15 and 20 days.

Figure 6:
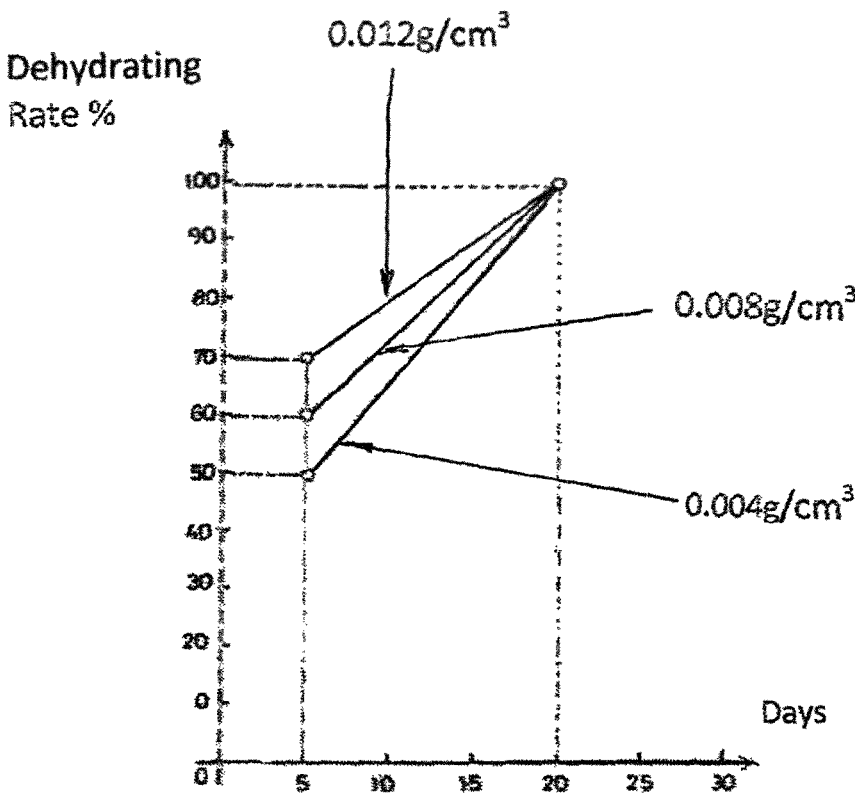

FIG. 6 shows the behavior of the solution using Ca Sulfate, according to Example No. 31 to No. 33 with an increasing rate after 5 days.

It is then understood that:

The main active ingredient is Na Bicarbonate, while:

No relevant activity is observed if the bicarbonate of bicarbonate is used alone Ammonium.

Ponceau Red 4R is not equivalent to or a substitute for carminic acid.

SO₄Ca lowers the pH and reduces the rate of absorption.

Ca (OH)₂ accelerates the absorption process.

The following chart summarizes the range of components of the ideal or preferred composition of the dehydrating solution of this invention:

| | | Range | | |
|---|---|---|---|---|
| Component | | Minimum | Maximum | Observations |
| Na bicarbonate | NaHCO₂ | 0.05 g/cm³ | 0.08 g/cm³ | Basic Component |
| Carminic Acid Basic Solution 3% Hydroalcoholic | | 0.30 cm³/cm³ | 0.80 cm³/cm³ | Component |
| Ca hydroxide | Ca (OH)₂ | 0.002 g/cm³ | 0.003 g/cm³ | Optional |

Examples 3 to 7, plotted in FIG. 1, show that the optimum concentration of the active ingredient NaHCO₃ in water is that of 0.07 g/cm³, with that of 0.5 g/cm³ being slower after 5 days. In addition, the main active ingredient of the invention is verified to be precisely a bicarbonate of Na water solution.

In Examples No. 8 to No. 11, which were not plotted, it can be seen that the use of a solution in water of only (HN₄)HCO₃ produces very poor results, achieving dehydration of the *Tillandsia* sp only after 90 days with a concentration of 0.15 g/cm³ and no results for lower concentrations.

Examples No. 12 to No. 17 (not plotted) show that the use of a carminic acid solution with no other additive does not produce any appreciable dehydration results in the *Tillandsia* sp.

In Examples 18 to 22, a solution of bicarbonate of Na was used+carminic acid. As already mentioned, carminic acid increases the pH of the solution and in combination with the

The invention claimed is:

1. A composition for dehydrating *Tillandsia* sp, the composition comprising, in an aqueous solution; (i) a main component selected from the group consisting of sodium bicarbonate (NaHCO₃), ammonium bicarbonate ((NH₄)HCO₃) calcium hydroxide, and combinations thereof; (ii) 45-100 g/1000 cm³ of the sodium bicarbonate; and (iii) a hydroalcoholic solution of carminic acid at 0.30-0.80 cm³/1000 cm³ of the aqueous solution.

2. The composition of claim 1, wherein the composition comprises 50-100 g/1000 cm³ of the sodium bicarbonate.

3. The composition of claim 1, wherein the composition comprises 50-100 g/1000 cm³ of the sodium bicarbonate and 0.30-0.80 cm³/1000 cm³ of the hydroalcoholic solution of carminic acid.

4. The composition of claim 1, wherein the composition comprises 50-80 g/1000 cm³ of the sodium bicarbonate, 0.30-0.80 cm$^3$/100 cm$^3$ of the hydroalcoholic solution of carminic acid, and 200 g/1000 cm$^3$ of the ammonium bicarbonate.

5. The composition of claim 1, wherein the composition comprises 50-100 g/1000 cm$^3$ of the sodium bicarbonate, with 0.30-0.80 cm$^3$ of the hydroalcoholic solution of carminic acid, and 40-120 g/1000 cm$^3$ of the calcium sulfate.

\* \* \* \* \*